United States Patent
Li et al.

(10) Patent No.: US 12,532,003 B2
(45) Date of Patent: Jan. 20, 2026

(54) DATA PROCESSING IN BAND OFFSET MODE OF SAMPLE ADAPTIVE OFFSET

(71) Applicant: SHANGHAI BILIBILI TECHNOLOGY CO., LTD., Shanghai (CN)

(72) Inventors: Xiaobo Li, Shanghai (CN); Tianxiao Ye, Shanghai (CN)

(73) Assignee: SHANGHAI BILIBILI TECHNOLOGY CO., LTD., Shanghai (CN)

( * ) Notice: Subject to any disclaimer, the term of this patent is extended or adjusted under 35 U.S.C. 154(b) by 122 days.

(21) Appl. No.: 18/342,669

(22) Filed: Jun. 27, 2023

(65) Prior Publication Data

US 2023/0353746 A1 Nov. 2, 2023

Related U.S. Application Data

(63) Continuation of application No. PCT/CN2022/072880, filed on Jan. 20, 2022.

(30) Foreign Application Priority Data

Feb. 24, 2021 (CN) .......................... 202110208657.7

(51) Int. Cl.
  *H04N 19/182* (2014.01)
  *H04N 19/119* (2014.01)
  (Continued)

(52) U.S. Cl.
  CPC ......... *H04N 19/182* (2014.11); *H04N 19/119* (2014.11); *H04N 19/132* (2014.11);
  (Continued)

(58) Field of Classification Search
  CPC .................................................. H04N 19/182
  See application file for complete search history.

(56) References Cited

U.S. PATENT DOCUMENTS

2012/0177107 A1* 7/2012 Fu .......................... H04N 19/70
  375/240.03
2013/0114909 A1* 5/2013 Kim ..................... H04N 19/182
  382/233

(Continued)

FOREIGN PATENT DOCUMENTS

CN 103238318 A 8/2013
CN 103518375 A 1/2014

(Continued)

OTHER PUBLICATIONS

Chinese Search Report, 202110208657.7, Apr. 27, 2022, 3 pages.

(Continued)

*Primary Examiner* — David N Werner
(74) *Attorney, Agent, or Firm* — FisherBroyles, LLP

(57) ABSTRACT

A method is provided that includes: traversing all reconstructed pixels in a coding tree block, calculating a band value of each traversed reconstructed pixel, and calculating a residual value between each traversed reconstructed pixel and a corresponding original pixel; storing the calculated band value of each reconstructed pixel in a first array, and storing the calculated residual value between each reconstructed pixel and the corresponding original pixel in a second array; determining whether m consecutive band values in the first array belong to a same band; and in response to determining that the m consecutive band values in the first array belong to the same band, calculating, based on a residual value in the second array, a cumulative residual value of m reconstructed pixels corresponding to the m consecutive band values, and calculating a cumulative number of the m reconstructed pixels.

15 Claims, 6 Drawing Sheets

(51) Int. Cl.
*H04N 19/132* (2014.01)
*H04N 19/44* (2014.01)
*H04N 19/89* (2014.01)
*H04N 19/895* (2014.01)
*H04N 19/96* (2014.01)

(52) U.S. Cl.
CPC ............ *H04N 19/44* (2014.11); *H04N 19/89* (2014.11); *H04N 19/895* (2014.11); *H04N 19/96* (2014.11)

(56) References Cited

U.S. PATENT DOCUMENTS

| | | | |
|---|---|---|---|
| 2014/0229433 A1* | 8/2014 | Nakajima | H04Q 9/02 707/613 |
| 2014/0254674 A1* | 9/2014 | Lee | H04N 19/139 375/240.12 |
| 2014/0334536 A1* | 11/2014 | Sze | H04N 19/172 375/240.02 |
| 2015/0092850 A1* | 4/2015 | Talebi Esfandarani | H04N 19/105 375/240.12 |
| 2015/0237360 A1 | 8/2015 | Kim et al. | |
| 2016/0119636 A1* | 4/2016 | Maani | H04N 19/50 375/240.02 |
| 2016/0150251 A1* | 5/2016 | Kim | H04N 19/91 375/240.29 |
| 2017/0006289 A1 | 1/2017 | Alshina et al. | |
| 2020/0137401 A1* | 4/2020 | Kim | H04N 19/86 |
| 2020/0404286 A1* | 12/2020 | Karczewicz | H04N 19/46 |
| 2022/0007038 A1* | 1/2022 | Kim | H04N 19/00 |
| 2022/0385913 A1* | 12/2022 | Francois | H04N 19/182 |
| 2023/0051471 A1* | 2/2023 | Kim | H04N 19/117 |

FOREIGN PATENT DOCUMENTS

| | | |
|---|---|---|
| CN | 105141948 A | 12/2015 |
| CN | 105635732 A | 6/2016 |
| CN | 105794206 A | 7/2016 |
| CN | 105993174 A | 10/2016 |
| CN | 108810543 A | 11/2018 |
| CN | 109963160 A | 7/2019 |
| CN | 110689590 A | 1/2020 |
| CN | 111567045 A | 8/2020 |
| CN | 112927311 A | 6/2021 |
| WO | 2020139005 A1 | 7/2020 |

OTHER PUBLICATIONS

PCT Search Report, PCT /CN2022/072880, Apr. 19, 2022, 6 pages.
Zhang, Guanwen, et al., "CNN-Based Sample Adaptive Offset Optimization in HEVC for Streaming Video," Proceedings of the 2019 IEEE International Conference on Real-time Computing and Robotics, Aug. 4-9, 2019, Russia, 4 pages.
European Search Report of the counterpart EP application No. 22758721.9, official mailing date: Mar. 11, 2024, 11 pages.
Andrey Norkin et al: "Chapter 7: In-Loop Filters in HEVC" In: "High Efficiency Video Coding (HEVC)", Aug. 23, 2014, Springer International Publishing, Cham, XP055614202, ISBN: 978-3-319-06894-7, pp. 171-208.
Zhou Jianbin et al: "A Dual-Clock VLSI Design of H.265 Sample Adaptive Offset Estimation for 8k Ultra-HD TV Encoding", IEEE Transactions on Very Large Scale Integration (VISI) Systems, IEEE Service Center, vol. 25, No. 2, XP011639482, Feb. 1, 2017, pp. 714-724.
Gendy Sayed El et al: "Low Cost VLSI Architecture for Sample Adaptive Offset Encoder in HEVC" , 2016 IEEE Computer Society Annual Symposium on VLSI (ISVLSI), IEEE, XP032958180, Jul. 11, 2016, pp. 170-175.
Jiayi Zhu et al: "Fast SAO estimation algorithm and its VLSI architecture", 2014 IEEE International Conference on Image Processing (ICIP), IEEE, XP032966796, Oct. 27, 2014, pp. 1278-1282.

* cited by examiner

DATA PROCESSING IN BAND OFFSET MODE OF SAMPLE ADAPTIVE OFFSET

CROSS-REFERENCE TO RELATED APPLICATIONS

This application is a continuation under 35 U.S.C. 111(a) of PCT International Application No. PCT/CN2022/072880, filed on Jan. 20, 2022, which claims priority to Chinese Patent Application No. 202110208657.7, filed with the China National Intellectual Property Administration on Feb. 24, 2021, the entire contents of which are hereby incorporated by reference in their entirety for all purpose.

TECHNICAL FIELD

The present application relates to the field of video image coding technologies, and in particular, to data processing in a band offset mode of sample adaptive offset.

BACKGROUND

High Efficiency Video Coding (HEVC) is a video compression standard. In the prior art, after a video is compressed through HEVC, to reduce a distortion between a reconstructed image and an original image, pixel compensation is performed on the reconstructed image by using a sample adaptive offset (SAO) technology.

When pixel compensation is performed by using the SAO technology, pixel compensation may be implemented in an edge offset (EO) mode or a band offset (BO) mode. In the BO mode, classification is performed based on a pixel value range, to equally divide pixel values into 32 bands. For example, a pixel value range of an 8-bit image is [0, 255]. In this case, during division of bands, each band includes eight pixel values, and a pixel value range of the $k^{th}$ band is [8 k, 8 k+7].

SUMMARY

Some embodiments of the present application provide a method for data processing in a band offset mode of sample adaptive offset, a computer device, and a non-transitory computer-readable storage medium.

According to a first aspect of the embodiments of the present application, a method is provided, including:
acquiring a target reconstructed image, and dividing the target reconstructed image into a plurality of non-overlapping coding tree blocks;
traversing all reconstructed pixels in each coding tree block, calculating a band value of each traversed reconstructed pixel, and calculating a residual value between each traversed reconstructed pixel and a corresponding original pixel;
storing the calculated band value of each reconstructed pixel in a first array, and storing the calculated residual value between each reconstructed pixel and the corresponding original pixel in a second array; and
in response to determining that m consecutive band values in the first array belong to a same band, calculating, at a time based on the residual value in the second array, a cumulative residual value of m reconstructed pixels corresponding to the m consecutive band values, and calculating a cumulative number of the m reconstructed pixels, wherein m is an integer greater than or equal to 2.

According to a second aspect of the present application, a computer device is provided, including a processor and a memory, where the memory stores computer executable instructions that, when executed by the processor, cause the processor to implement the steps of the above method.

According to a third aspect of the present application, a non-transitory computer-readable storage medium is provided, where the non-transitory computer-readable storage medium has computer instructions stored thereon that, when executed by a processor, cause the processor to implement the steps of the above method.

BRIEF DESCRIPTION OF THE DRAWINGS

FIG. 3 is a schematic diagram of pixel values of all reconstructed pixels in a coding tree block;

FIG. 4 is a schematic diagram of band values corresponding to the pixel values of all the reconstructed pixels in the coding tree block in FIG. 3;

DETAILED DESCRIPTION OF EMBODIMENTS

Figure 1:
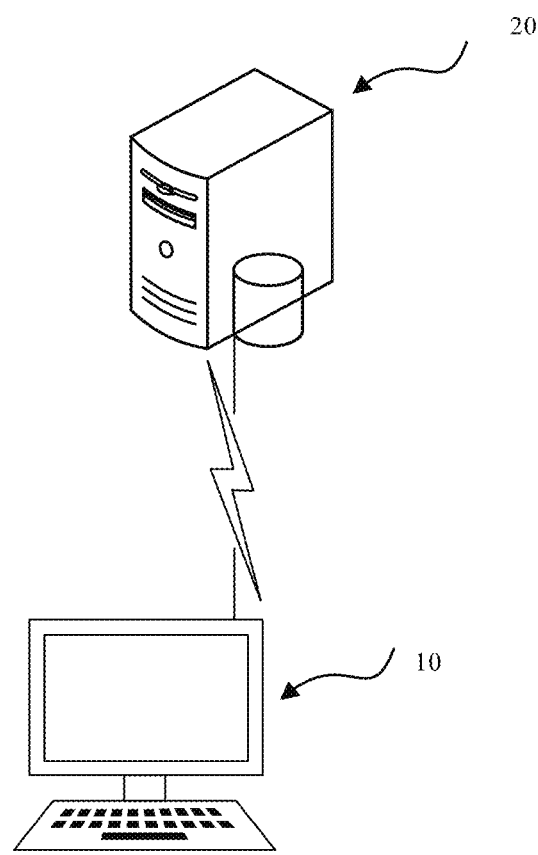
FIG. 1 is a schematic diagram of an environment for a method for data processing in a band offset mode of sample adaptive offset according to some embodiments of the present application.

The advantages of the present application are further described below with reference to accompanying drawings and exemplary embodiments.

Exemplary embodiments are illustrated in detail herein, and examples thereof are shown in the accompanying drawings. When the following description refers to the figures, the same numerals in different figures represent the same or similar elements unless otherwise indicated. The implementations described in the following exemplary embodiments do not represent all implementations consistent with the present disclosure. Instead, they are merely examples of apparatuses and methods consistent with some aspects of the present disclosure as detailed in the appended claims.

The terms used in the present disclosure are merely for the purpose of describing specific embodiments, and are not intended to limit the present disclosure. The terms "a/an", "said", and "the" in the singular form used in the present disclosure and the appended claims are also intended to include the plural form unless otherwise clearly indicated in the context. It should also be understood that the term "and/or" used herein refers to and includes any or all possible combinations of one or more of the associated listed items.

It should be understood that although the terms, such as first, second, and third, may be used in the present disclosure to describe various types of information, such information should not be limited to these terms. These terms are merely used to distinguish the same type of information from one another. For example, without departing from the scope of the present disclosure, first information may alternatively be referred to as second information, and similarly, second information may alternatively be referred to as first information. Depending on the context, the word "if" as used herein may be interpreted as "when" or "upon" or "in response to determining".

In the description of the present application, it should be understood that, the reference numerals of steps do not indicate the order of execution of the steps, but are merely to facilitate the description of the present application and differentiation between the steps, and thus will not be interpreted as limiting the present application.

During implementation of an existing BO mode, the residual values and the number of pixels of bands 0 to 31 in a current coding tree block (CTB) are calculated through the following steps:
1. declaring two temporary variables stats[32] and count[32], each with an initial value of 0;
2. calculating a band bt of a current pixel value. For example, if a reconstructed value of an 8-bit pixel is 15, the pixel belongs to the (15/8=1)th band;
3. calculating a difference between a current reconstructed pixel and an original pixel, that is, a residual diff; and
4. accumulating the residual values and calculating the number of pixels: stats[bt]+=diff; count[bt]++.

However, the inventors find that the above calculation method is time-consuming, which severely restricts application of the BO technology in scenarios such as live streaming, and also increases power consumption of a mobile device.

In view of this, a method for data processing in a band offset mode of sample adaptive offset, a computer device, and a non-transitory computer-readable storage medium are provided, so as to resolve a problem that an existing BO technology is time-consuming in calculating the residual values and the number of pixels of bands 0 to 31 in a CTB.

FIG. 1 a schematic block diagram of a method for data processing in a band offset mode of sample adaptive offset according to an embodiment of the present application. In an exemplary embodiment, a system of the application environment may include a computer device 10 and a server 20. A wireless or wired connection is formed between the computer device 10 and the server 20. The computer device 10 may be a mobile phone, an iPad, a tablet computer, a server, or the like. The sever 20 may be a rack server, a blade server, a tower server, or a cabinet server (including an independent server or a server cluster that includes a plurality of servers).

Figure 2:
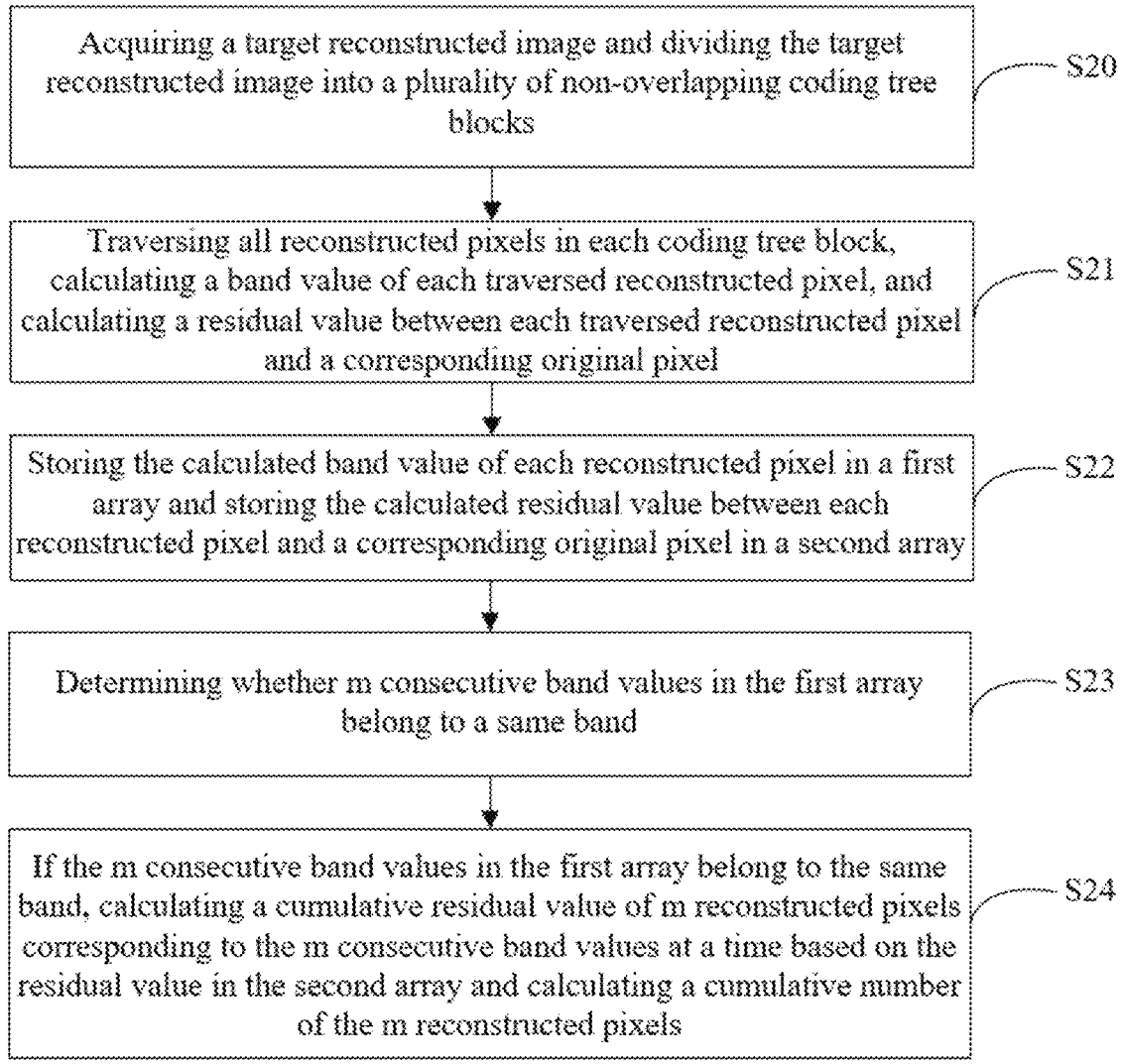
FIG. 2 is a flowchart of an embodiment of a method for data processing in a band offset mode of sample adaptive offset according to some embodiments of the present application.

FIG. 2 is a schematic flowchart of a method for data processing in a band offset mode of sample adaptive offset according to an embodiment of the present application. It may be understood that the flowchart in this method embodiment is not intended to limit an execution sequence of the steps. The following gives exemplary description by using a computer device as an execution body. It can be learned from the figure that the method for data processing in a band offset mode of sample adaptive offset in this embodiment includes the following steps.

In step S20, a target reconstructed image is acquired, and the target reconstructed image is divided into a plurality of non-overlapping coding tree blocks.

The target reconstructed image is an image obtained after a reconstructed image is deblocked, and is a frame of reconstructed image.

In this embodiment, when the target reconstructed image is divided into coding tree blocks, the entire frame of image is divided into blocks based on a coding tree unit (CTU) size preset by an encoder. For example, a size of the target reconstructed image is 128×128, and the CTU size is 64×64. In this case, the target reconstructed image may be divided into four non-overlapping coding tree blocks.

In step S21, all reconstructed pixels in each coding tree block are traversed, a band value of each traversed reconstructed pixel is calculated, and a residual value between each traversed reconstructed pixel and a corresponding original pixel is calculated.

A coding tree block (CTB) may be a brightness CTB or a chroma CTB included in a coding tree unit (CTU) in a sample adaptive offset (SAO) technology in HEVC. A coding tree block includes a plurality of reconstructed pixels, for example, includes 16×16, 32×32, and 64×64 pixels. In an example, FIG. 3 shows an area including 16×16 reconstructed pixels in a coding tree block, and pixel values of the reconstructed pixels in this area are shown in the figure.

Figures 3, 4:
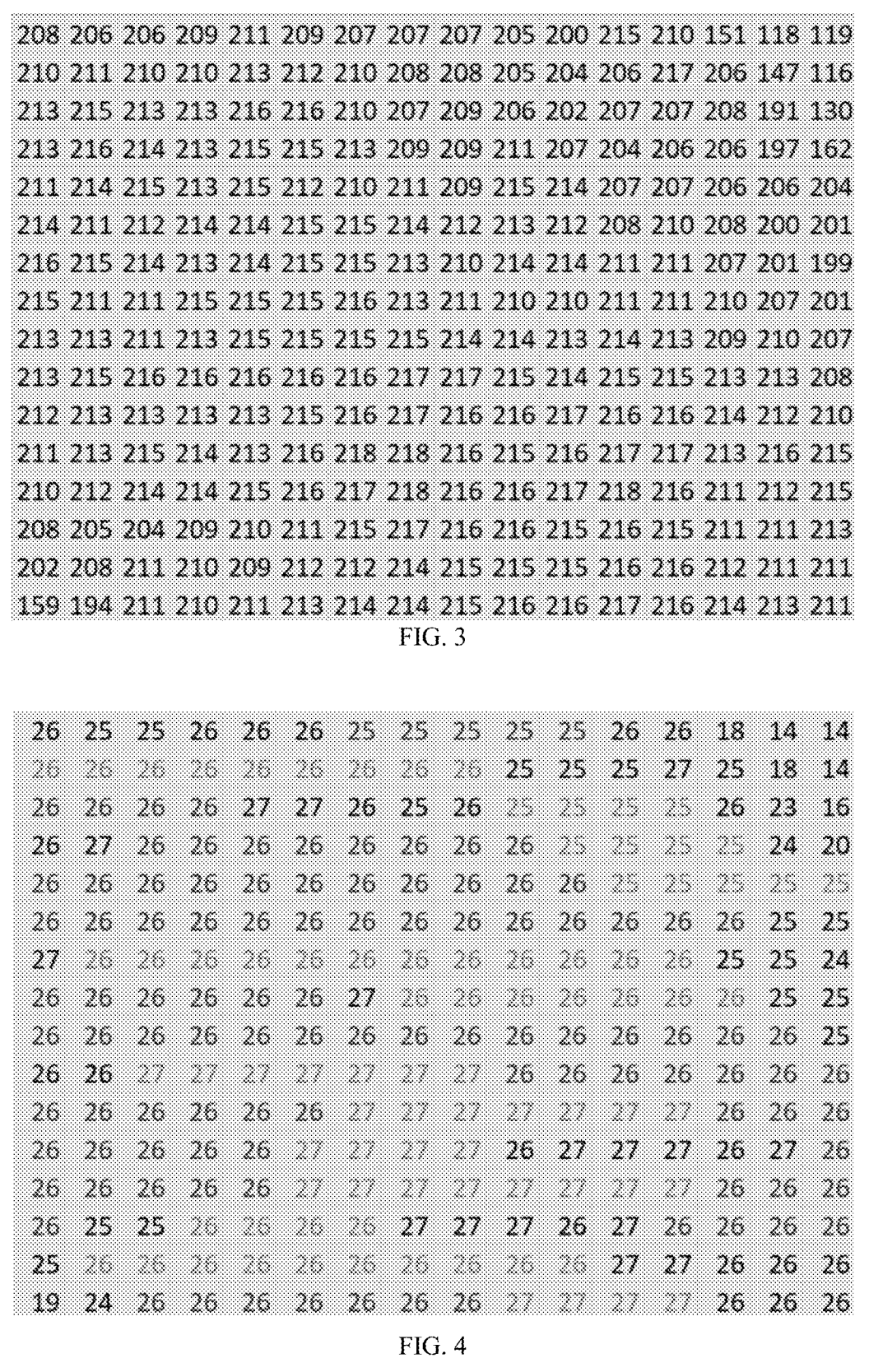

It should be noted that, for the coding tree block shown in FIG. 3, an 8-bit image is used as an example. A reconstructed pixel is a pixel obtained after each pixel in an original image is restored.

In this embodiment, when a band value of each reconstructed pixel is calculated, a range of pixel values included in each band may be first determined based on a pixel value range of pixels in the image. For example, if the pixel value range of the pixels in the image is 0-255, it may be determined that each band includes 256/32=8 pixel values; or if the pixel value range of the pixels in the image is 0-65535, it may be determined that each band includes 2048 pixel values.

In an example, after a band value of each reconstructed pixel in FIG. 3 is calculated, a band value, shown in FIG. 4, that corresponds to each reconstructed pixel may be obtained.

A residual difference diff between each reconstructed pixel and a corresponding original pixel is a difference between a pixel value a of the reconstructed pixel and a pixel value b of the corresponding original pixel, that is, diff=a−b.

It may be understood that, in this embodiment of the present application, to reduce a data processing time, band values and residual values of all reconstructed pixels in the coding tree block may be calculated in advance, instead of calculating the band values and the residual values when the values need to be used.

In step S22, the calculated band value of each reconstructed pixel is stored in a first array, and the calculated residual value between each reconstructed pixel and a corresponding original pixel is stored in a second array.

To facilitate subsequent sequential acquisition of the band value of each reconstructed pixel and the residual value between each reconstructed pixel and a corresponding original pixel, the band value may be stored in the first array, and the residual value may be stored in the second array. For example, the band value is stored in a bttype array, and the residual value is stored in a btdiff array.

In step S23, whether m consecutive band values in the first array belong to a same band is determined, where m is an integer greater than or equal to 2.

In an example, whether a first batch of eight consecutive band values in the first array belong to the same band is determined. If the eight band values belong to the same band, a next batch of eight consecutive band values may be further acquired from the first array, and whether the next batch of eight consecutive band values belong to the same band is determined, until determining is performed on all band values in the first array.

In step S24, if the m consecutive band values in the first array belong to the same band, a cumulative residual value of m reconstructed pixels corresponding to the m consecutive band values is calculated at a time based on the residual value in the second array, and a cumulative number of the m reconstructed pixels is calculated.

The cumulative residual value is a cumulative sum of residual values between the m reconstructed pixels and corresponding original pixels. For example, m=8, and residual values between the eight reconstructed pixels and corresponding original pixels are 5, 8, 7, 6, 4, 3, 12, 9. In this case, the cumulative residual value=5+8+7+6+4+3+12+9=54.

The cumulative number is the number of the m reconstructed pixels. For example, if m=8, the cumulative number is also 8; or if m=4, the cumulative number is 4.

In this embodiment, when it is determined that the m consecutive band values in the first array belong to the same band, residual values of the m reconstructed pixels corresponding to the m band values may be read from the second array at a time, and then a cumulative sum of the m read residual values may be calculated at a time, without a need to read the m residual values from the second array one by one or accumulating the read residual values one by one.

It should be noted that, after the cumulative residual value is calculated and the cumulative number is calculated, the obtained cumulative residual value may be added to a sum variable of a corresponding band p, the cumulative number m may be added to a count variable of the corresponding band p, and then a subsequent processing operation is performed. In this embodiment, the subsequent processing operation belongs to the prior art, and details are not described in this embodiment.

In this embodiment of the present application, all reconstructed pixels in a coding tree block are traversed, a band value of each traversed reconstructed pixel is calculated, and a residual value between each traversed reconstructed pixel and a corresponding original pixel is calculated; the calculated band value of each reconstructed pixel is stored in a first array, and the calculated residual value between each reconstructed pixel and the corresponding original pixel is stored in a second array; whether m consecutive band values in the first array belong to the same band is determined, where m is an integer greater than or equal to 2; and if the m consecutive band values in the first array belong to the same band, a cumulative residual value of m reconstructed pixels corresponding to the m band values is calculated at a time based on a residual value in the second array, and a cumulative number of the m reconstructed pixels is calculated. In the embodiments of the present application, when it is determined, through traversal, that a plurality of pixels belong to the same band, the calculation of the residuals of these pixels belonging to the same band and the calculation of the number of these pixels are completed at a time, thereby reducing memory read and write operations, and further reducing the calculation time consumption and reducing power consumption.

Through experimental statistics, memory read and write operations of a BO module can be reduced by approximately 67.2% by using the calculation method in the present application. In addition, for no matter the Android/iOS of a mobile device or a PC, memory read and write operations are quite slow and power-consuming. Therefore, because memory read and write operations are reduced in the present application, power consumption can be greatly reduced in the calculation scheme of the present application. In addition, the BO module can also be accelerated by approximately 48.2% in the calculation method. In the prior art, in a scenario such as live streaming, a processing time of a BO module accounts for approximately 10% of the entire coding/decoding time. If the technical solution of the present application is applied to the BO module, live streaming coding can be directly accelerated by approximately 4.8%. This can not only reduce power consumption, but also accelerate live streaming coding.

Figure 5:
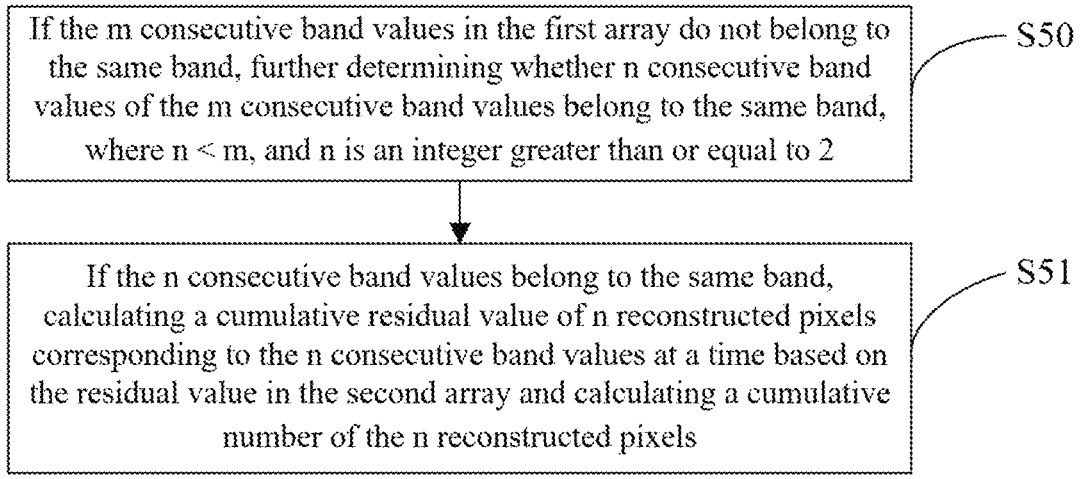
FIG. 5 is a flowchart of another embodiment of a method for data processing in a band offset mode of sample adaptive offset according to some embodiments of the present application.

In an exemplary implementation, as shown in FIG. 5, the method for data processing in a band offset mode of sample adaptive offset further includes the following steps.

In step S50, if the m consecutive band values in the first array do not belong to the same band, whether n consecutive band values of the m consecutive band values belong to the same band is further determined, where n<m, and n is an integer greater than or equal to 2.

In an example, m=8, and n=4. In this case, when it is determined that the eight consecutive band values in the first array do not belong to the same band, for example, when five consecutive band values belong to a band 15, and the other three band values belong to a band 16, whether four consecutive band values of the eight band values belong to the same band may be further determined.

It should be noted that the n consecutive band values may be n consecutive band values at any locations of the m band values, for example, may be the $1^{st}$ band value to the $n^{th}$ band value of the m band values, the $2^{nd}$ band value to the $(n+1)^{th}$ band value of the m band values, or the $3^{rd}$ band value to the $(n+2)^{th}$ band value of the m band values.

Preferably, the n consecutive band values are the $1^{st}$ band value to the $n^{th}$ band value of the m band values, or the $(m-n+1)^{th}$ band value to the $m^{th}$ band value of the m band values. In an example, when m=8 and n=4, the four consecutive band values are the $1^{st}$ band value to the $4^{th}$ band value of the eight band values, or the four consecutive band values are the $5^{th}$ band value to the $8^{th}$ band value of the eight band values.

In step S51, if the n consecutive band values belong to the same band, a cumulative residual value of n reconstructed pixels corresponding to the n consecutive band values is calculated at a time based on the residual value in the second array, and a cumulative number of the n reconstructed pixels is calculated.

When it is determined that the n consecutive band values belong to the same band, residual values of the n reconstructed pixels corresponding to the n band values may be read from the second array at a time, and then a cumulative sum of the n read residual values may be calculated at a time, without a need to read the n residual values from the second array one by one or accumulating the read residual values one by one.

It should be noted that, after the cumulative residual value and the cumulative number are calculated, the obtained cumulative residual value may be added to a sum variable of a corresponding band p, the cumulative number n may be added to a count variable of the corresponding band p, and then a subsequent processing operation is performed. In this embodiment, the subsequent processing operation belongs to the prior art, and details are not described in this embodiment.

In this embodiment, when it is determined that the m consecutive band values do not belong to the same band, whether the n consecutive band values of the m band values belong to the same band is further determined, and when the n consecutive band values belong to the same band, the calculation of the residuals of these pixels belonging to the same band and the calculation of the number of these pixels are completed at a time, thereby reducing memory read and write operations, and further reducing the calculation time consumption and reducing power consumption.

It should be noted that, in this embodiment, when it is determined that the n consecutive band values do not belong to the same band, whether k consecutive band values belong to the same band may be further determined, where k is an integer less than n. In this embodiment, a specific number of times of performing the above determining step is not limited in this embodiment, and may be set based on an actual situation.

Figure 6:
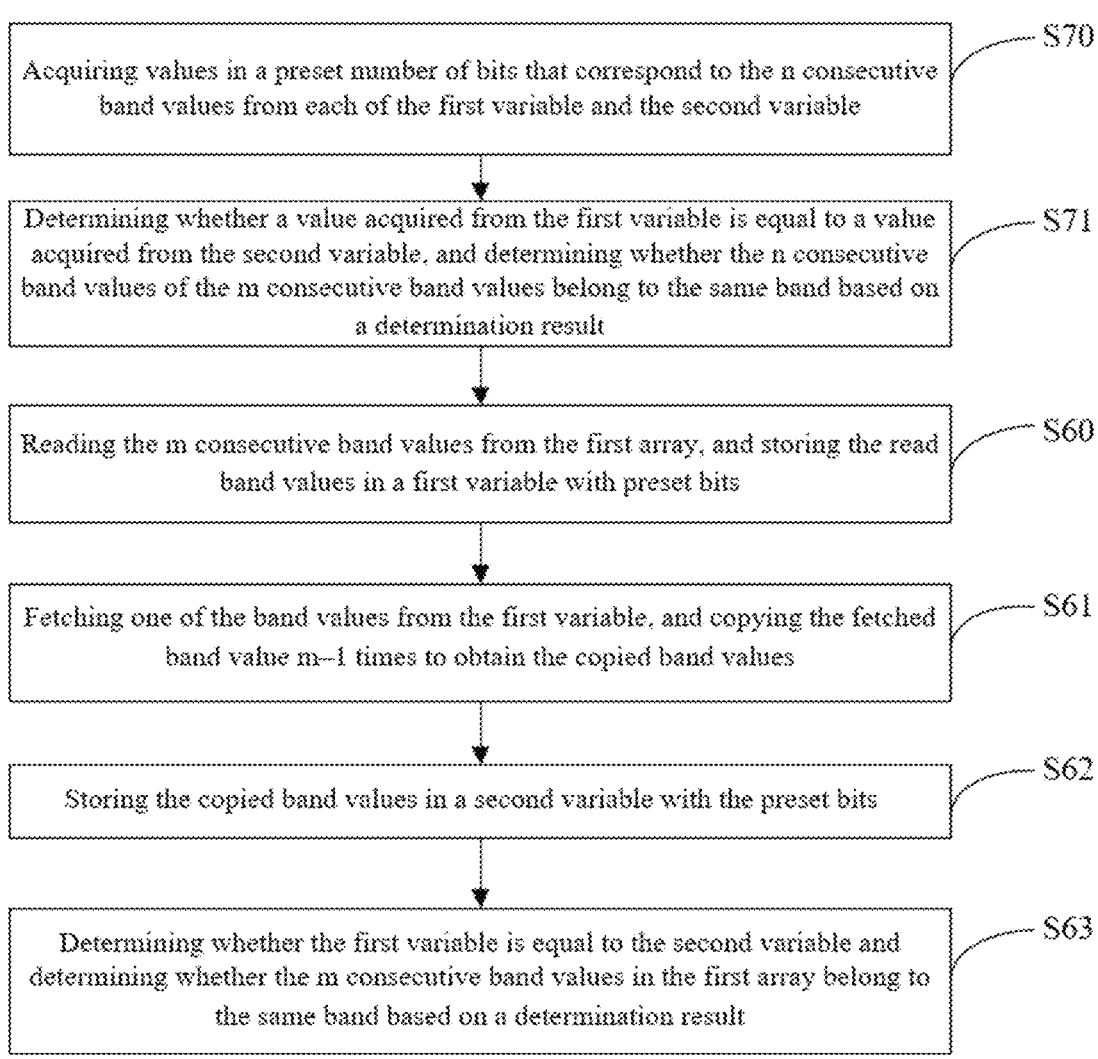
FIG. 6 is a detailed schematic flowchart of a step of determining whether m consecutive band values in the first array belong to the same band according to some embodiments of the present application.

In an exemplary implementation, as shown in FIG. 6, the step of determining whether m consecutive band values in the first array belong to the same band may include steps S60 to S63.

In step S60, the m consecutive band values are read from the first array, and the read band values are stored in a first variable with preset bits.

The first variable may be a global variable or a local variable. In this embodiment, the first variable is preferably a local variable, for example, a local variable classIdx_64. The number of preset bits is a preset value. For example, the preset bits are 64 bits. It may be understood that the number of preset bits may alternatively be another value, and a specific value of the preset bits may be set based on an actual situation.

In an example, the read band values may be stored in a 64-bit local variable classIdx_64.

In step S61, one of the band values is fetched from the first variable, and the fetched band value is copied m−1 times to obtain the copied band values.

One band value may be randomly fetched from m band values included in the first variable, for example, the $2^{nd}$ band value is fetched. Alternatively, a band value at a preset location may be fetched from the m band values included in the first variable, where the preset location is preset or defaulted. For example, if the preset location is the $1^{st}$ location, a band value in the $1^{st}$ location may be fetched.

In this embodiment, after a band value is fetched, to make the number of finally obtained band values be the same as the number of band values included in the first variable, the fetched band value may be copied m−1 times to obtain copied band values, and the copied band values are stored in a second variable with the preset bits to obtain m band values.

In step S62, the copied band values are stored in a second variable with the preset bits.

The second variable is of the same type as the first variable, and may be a global variable or a local variable. In this embodiment, the second variable is preferably a local variable, for example, a local variable classIdx_rep. The number of preset bits is a preset value. For example, the preset bits are 64 bits.

In an example, the copied band values may be stored in a 64-bit local variable classIdx_rep.

In step S63, whether the first variable is equal to the second variable is determined, and whether the m consecutive band values in the first array belong to the same band is determined based on a determination result.

When the determining result is that the first variable is equal to the second variable, it may be determined that the m consecutive band values in the first array belong to the same band; or when the determining result is that the first variable is not equal to the second variable, it may be determined that the m consecutive band values in the first array do not belong to the same band.

In this embodiment, the second variable is generated by copying the fetched band value m−1 times, thereby reducing a time for generating the second variable.

Figure 7:
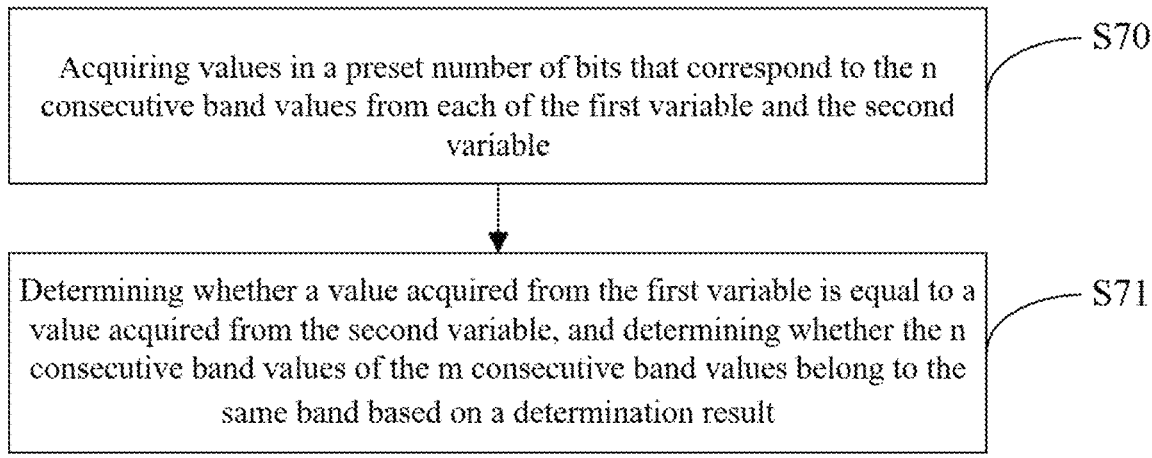
FIG. 7 is a detailed schematic flowchart of a step of determining whether n consecutive band values of the m band values belong to the same band according to some embodiments of the present application.

In an exemplary implementation, as shown in FIG. 7, when the first variable is not equal to the second variable, the determining whether n consecutive band values of the m band values belong to the same band may include steps S70 and S71.

In step S70, values in a preset number of bits that correspond to the n consecutive band values are acquired from each of the first variable and the second variable.

The preset number of bits may be determined based on the number of bits used to represent each band value. For example, when a band value is represented by an 8-bit value, it may be determined that the preset number of bits is 8n; when a band value is represented by a 5-bit value, it may be determined that the preset number of bits is 5n; or when a band value is represented by a 16-bit value, it may be determined that the preset number of bits is 16n.

In this embodiment, a specific number of bits of a value to be acquired is related to locations of the n band values in the m band values.

In an example, m=8, n=4, each band value is represented by an 8-bit value, the first variable with the preset bits is a 64-bit first variable, the four band values are the $1^{st}$ band value to the $4^{th}$ band value of the eight band values. In this case, when the values in the preset number of bits that correspond to the n consecutive band values are acquired from the first variable and the second variable, values from the $1^{st}$ bit to the $32^{nd}$ bit may be acquired from each of the first variable and the second variable.

It may be understood that when the four band values are the $2^{nd}$ band value to the $5^{th}$ band value of the eight band values, when the value that has the preset number of bits and that corresponds to the n band values is acquired from the first variable and the second variable, a value with the $9^{th}$ bit to the $40^{th}$ bit may be obtained from each of the first variable and the second variable.

In an exemplary implementation, if m=8, n=4, each band value is represented by an 8-bit value, and the first variable with the preset bits is a 64-bit first variable, the acquiring, from each of the first variable and the second variable, a value that has a preset number of bits and that corresponds to the n band values may include:

acquiring, from each of the first variable and the second variable, values in 32 least significant bits or 32 most significant bits.

In this embodiment, to facilitate acquisition of values from the first variable and the second variable, the value with the 32 least significant bits or the 32 most significant bits may be directly acquired.

In step S71, whether a value acquired from the first variable is equal to a value acquired from the second variable is determined, and whether the n consecutive band values of the m consecutive band values belong to the same band is determined based on a determination result.

When the determining result is that the value acquired from the first variable is equal to the value acquired from the second variable, it may be determined that the n consecutive band values of the m band values belong to the same band; or when the determining result is that the value acquired from the first variable is not equal to the value acquired from the second variable, it may be determined that the n consecutive band values of the m band values do not belong to the same band.

In an exemplary implementation, the method further includes:
  if the m consecutive band values in the first array do not belong to the same band, separately calculating the residual value of each reconstructed pixel and a number of reconstructed pixels.

When the m consecutive band values in the first array do not belong to the same band, in other words, belong to different bands, a residual value of each reconstructed pixel and the number of reconstructed pixels may be separately calculated. That is, only one residual value is read from the second array at a time. Then the read residual value is added to a sum variable of a corresponding band p, and a number 1 is added to a count variable of the corresponding band p. Then a subsequent processing operation is performed. In this embodiment, the subsequent processing operation belongs to the prior art, and details are not described in this embodiment.

Figure 8:
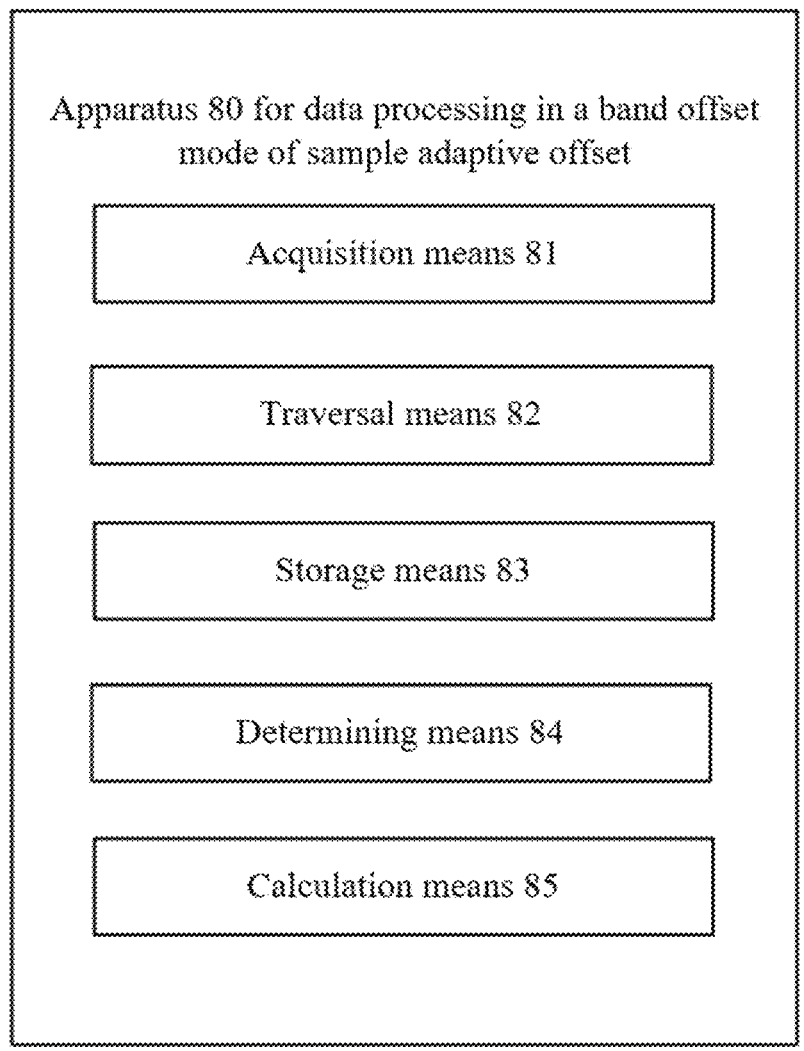
FIG. 8 is a diagram of program modules of an embodiment of an apparatus for data processing in a band offset mode of sample adaptive offset according to some embodiments of the present application.

FIG. 8 is a diagram of program modules of an embodiment of an apparatus 80 for data processing in a band offset mode of sample adaptive offset according to the present application.

In this embodiment, the apparatus 80 for data processing in a band offset mode of sample adaptive offset includes a series of computer program instructions stored in a memory. When the computer program instructions are executed by a processor, the function for data processing in a band offset mode of sample adaptive offset according to each embodiment of the present application can be implemented. In some embodiments, the apparatus 80 for data processing in a band offset mode of sample adaptive offset may be divided into one or more modules based on specific operations implemented by various parts of the computer program instructions. For example, in FIG. 8, the apparatus 80 for data processing in a band offset mode of sample adaptive offset may be divided into an acquisition module 81, a traversal module 82, a storage module 83, a determining module 84, and a calculation module 85.

The acquisition module 81 is configured to acquire a target reconstructed image, and divide the target reconstructed image into a plurality of non-overlapping coding tree blocks.

The traversal module 82 is configured to: traverse all reconstructed pixels in each coding tree block, calculate a band value of each traversed reconstructed pixel, and calculate a residual value between each traversed reconstructed pixel and a corresponding original pixel.

The storage module 83 is configured to store the calculated band value of each reconstructed pixel in a first array, and store the calculated residual value between each reconstructed pixel and a corresponding original pixel in a second array.

The determining module 84 is configured to determine whether m consecutive band values in the first array belong to a same band, where m is an integer greater than or equal to 2.

The calculation module 85 is configured to: if the m consecutive band values in the first array belong to the same band, calculate, at a time based on the residual value in the second array, a cumulative residual value of m reconstructed pixels corresponding to the m consecutive band values, and calculate a cumulative number of the m reconstructed pixels.

In an exemplary implementation, the determining module 84 is further configured to: if the m consecutive band values in the first array do not belong to the same band, further determine whether n consecutive band values of the m consecutive band values belong to the same band, where n<m, and n is an integer greater than or equal to 2; and if the n consecutive band values belong to the same band, calculate, at a time based on the residual value in the second array, a cumulative residual value of n reconstructed pixels corresponding to the n consecutive band values, and calculate a cumulative number of the n reconstructed pixels.

In an exemplary implementation, the determining module 84 is further configured to: read the m consecutive band values from the first array, and store the read band values in a first variable with preset bits; fetch one of the band values from the first variable, and copy the fetched band value m−1 times to obtain the copied band values; store the copied band values in a second variable with the preset bits; and determine whether the first variable is equal to the second variable, and determine, based on a determination result, whether the m consecutive band values in the first array belong to the same band.

In an exemplary implementation, when the first variable is not equal to the second variable, the determining module 84 is further configured to: acquire, from each of the first variable and the second variable, values in a preset number of bits that correspond to the n consecutive band values; and determine whether the value acquired from the first variable is equal to the value acquired from the second variable, and determine, based on a determination result, whether the n consecutive band values of the m consecutive band values belong to the same band.

In an exemplary implementation, the determining module 84 is further configured to fetch a band value at a preset location from the first variable.

In an exemplary implementation, m=8, n=4, each band value is represented by an 8-bit value, the first variable with the preset bits is a 64-bit first variable, and the determining module 83 is further configured to acquire, from each of the first variable and the second variable, values in 32 least significant bits or 32 most significant bits.

In an exemplary implementation, the apparatus 80 for data processing in a band offset mode of sample adaptive offset further includes a calculation module.

The counting module is configured to: if the m consecutive band values in the first array do not belong to the same band, separately calculate the residual value of each reconstructed pixel and a number of reconstructed pixels.

In the embodiments of the present application, a target reconstructed image is acquired, and the target reconstructed image is divided into a plurality of non-overlapping coding tree blocks; all reconstructed pixels in each coding tree block are traversed, a band value of each traversed reconstructed pixel is calculated, and a residual value between each traversed reconstructed pixel and a corresponding original pixel is calculated; the calculated band value of each reconstructed pixel is stored in a first array, and the calculated residual value between each reconstructed pixel and the corresponding original pixel is stored in a second array; whether m consecutive band values in the first array belong to the same band is determined, where m is an integer greater than or equal to 2; and if the m consecutive band values in the first array belong to the same band, a cumulative residual value of m reconstructed pixels corresponding to the m band values is calculated at a time based on a residual value in the second array, and a cumulative number of the m reconstructed pixels is calculated. In the embodiments of the present application, when it is determined, through traversal, that a plurality of pixels belong to the same band, the calculation of the residuals of these pixels belonging to the same band and the calculation of the number of these pixels are completed at a time, thereby reducing memory read and write operations, and further reducing the calculation time consumption and reducing power consumption.

Figure 9:
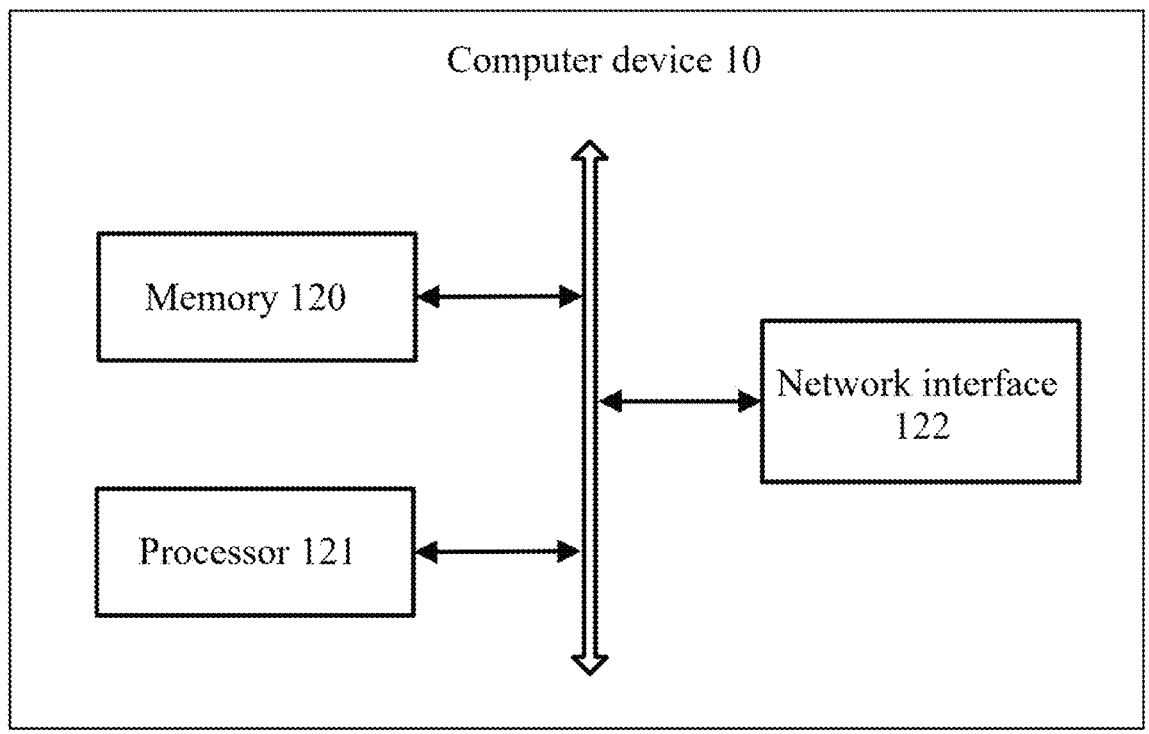
FIG. 9 is a schematic diagram of a hardware structure of a computer device for performing a method for data processing in a band offset mode of sample adaptive offset according to some embodiments of the present application.

FIG. 9 is a schematic diagram of a hardware structure of a computer device 10 suitable for performing a method for data processing in a band offset mode of sample adaptive offset according to an embodiment of the present application. In this embodiment, the computer device 10 is a device that can automatically perform numerical calculation and/or information processing according to preset or prestored instructions. For example, the computer device may be a tablet computer, a notebook computer, a desktop computer, a rack server, a blade server, a tower server, or a cabinet server (including an independent server or a server cluster that includes a plurality of servers). As shown in FIG. 9, the computer device 10 at least includes, but is not limited to: a memory 120, a processor 121, and a network interface 123 that may be communicatively linked to each other by using a system bus.

The memory 120 includes at least one type of computer-readable storage medium. The readable storage medium may be volatile or non-volatile. The readable storage medium includes a flash memory, a hard disk, a multimedia card, a card-type memory (for example, an SD or DX memory), a random access memory (RAM), a static random access memory (SRAM), a read-only memory (ROM), an electrically erasable programmable read-only memory (EE-PROM), a programmable read-only memory (PROM), a magnetic memory, a magnetic disk, an optical disc, and the like. In some embodiments, the memory 120 may be an internal storage module of the computer device 10, for example, a hard disk or memory of the computer device 10. In some other embodiments, the memory 120 may alternatively be an external storage device of the computer device 10, for example, a plug-in type hard disk equipped on the computer device 10, a smart media card (SMC for short), a secure digital (SD for short) card, or a flash card. Certainly, the memory 120 may alternatively include both the internal storage module of the computer device 10 and the external storage device of the computer device. In this embodiment, the memory 120 is generally configured to store an operating system and various application software installed on the computer device 10, such as program code for a method for data processing in a band offset mode of sample adaptive offset. In addition, the memory 120 may be further configured to temporarily store various types of data that have been output or are to be output.

In some embodiments, the processor 121 may be a central processing unit (CPU for short), a controller, a microcontroller, a microprocessor, or other chips for data processing in a band offset mode of sample adaptive offset. The processor 121 is generally configured to control overall operations of the computer device 10, for example, perform control, processing, and the like related to data exchange or communication with the computer device 10. In this embodiment, the processor 121 is configured to run program code stored in the memory 120 or to process data.

The network interface 123 may include a wireless network interface or a wired network interface. The network interface 123 is generally configured to establish a communication link between the computer device 10 and other computer devices. For example, the network interface 123 is configured to connect the computer device 10 to an external terminal by using a network, and establish a data transmission channel, a communication link, and the like between the computer device 10 and the external terminal. The network may be a wireless or wired network, such as Intranet, Internet, the Global System for Mobile Communications (GSM for short), wideband code division multiple access (WCDMA for short), a 4G network, a 5G network, Bluetooth, or Wi-Fi.

It should be noted that FIG. 9 shows only a computer device having components 120 to 122, but it should be understood that not all of the illustrated components are required to be implemented, and more or fewer components may be implemented instead.

In this embodiment, the method for data processing in a band offset mode of sample adaptive offset stored in the memory 120 may alternatively be divided into one or more program modules and executed by one or more processors (by the processor 121 in this embodiment) to implement the present application.

An embodiment of the present application provides a computer-readable storage medium having a computer program stored thereon, where when the computer program is executed by a processor, the steps of the method for data processing in a band offset mode of sample adaptive offset in the embodiments are implemented.

In this embodiment, the computer-readable storage medium includes a flash memory, a hard disk, a multimedia card, a card-type memory (for example, an SD or DX memory), a random access memory (RAM), a static random access memory (SRAM), a read-only memory (ROM), an electrically erasable programmable read-only memory (EE-PROM), a programmable read-only memory (PROM), a magnetic memory, a magnetic disk, an optical disc, and the like. In some embodiments, the computer-readable storage medium may be an internal storage unit of the computer device, for example, a hard disk or memory of the computer device. In some other embodiments, the computer-readable storage medium may alternatively be an external storage device of the computer device, for example, a plug-in type hard disk equipped on the computer device, a smart media card (SMC for short), a secure digital (SD for short) card, or a flash card. Certainly, the computer-readable storage medium may alternatively include both the internal storage unit of the computer device and the external storage device of the computer device. In this embodiment, the computer-readable storage medium is generally configured to store an operating system and various application software installed on the computer device, such as program code for a method for data processing in a band offset mode of sample adaptive offset in the embodiments. In addition, the computer-readable storage medium may be configured to temporarily store various types of data that have been output or are to be output.

The apparatus embodiments described above are merely exemplary, where units illustrated as separate components may be or may not be physically separated, and the components illustrated as units may be or may not be physical units. That is, the components may be positioned at one place or distributed on at least two network units. The object of the solutions in the embodiments of the present application can be achieved by selecting some or all of the modules therein according to actual needs. Those of ordinary skill in the art can understand and implement the solutions without any creative effort.

Through the descriptions of the above implementations, those of ordinary skill in the art can clearly understand that the implementations can be implemented by software and general hardware platforms. Definitely, the implementations can also be implemented by hardware. Those of ordinary skill in the art can understand that all or some of the procedures in the methods of the above embodiments can be implemented by a computer program to instruct related hardware. The program can be stored in a computer-readable storage medium. The program, when executed, may include the procedures in the above method embodiments. The storage medium may be a magnetic disk, an optical disc, a read-only memory (ROM), or a random access memory (RAM).

Finally, it should be noted that the above embodiments are merely used for illustrating rather than limiting the technical solutions of the present application. Although the present application is described in detail with reference to the above embodiments, those of ordinary skill in the art should understand that the technical solutions described in the above embodiments can still be modified, or some or all of the technical features therein can be equivalently substituted; and such modifications or substitutions do not make the essence of the corresponding technical solutions depart from the scope of the technical solutions of the embodiments of the present application.

What is claimed is:

1. A method, comprising:
acquiring a target reconstructed image;
dividing the target reconstructed image into a plurality of non-overlapping coding tree blocks;
traversing all reconstructed pixels in each coding tree block to calculate a band value of each traversed reconstructed pixel and a residual value between each traversed reconstructed pixel and a corresponding original pixel;
storing the calculated band value of each reconstructed pixel in a first array and the calculated residual value between each reconstructed pixel and the corresponding original pixel in a second array;
in response to determining that m consecutive band values in the first array belong to a same band, wherein m is an integer greater than or equal to 2:
  calculating, at a time based on the residual values in the second array of m reconstructed pixels corresponding to the m consecutive band values, a first cumulative residual value of the m reconstructed pixels; and
  calculating a first cumulative number of the m reconstructed pixels;
in response to determining that the m consecutive band values in the first array do not belong to the same band:
  in response to determining that n consecutive band values of the m consecutive band values belong to the same band, wherein n<m and n is an integer greater than or equal to 2:
    calculating, at a time based on the residual values in the second array of n reconstructed pixels corresponding to the n consecutive band values, a second cumulative residual value of the n reconstructed pixels; and
    calculating a second cumulative number of the n reconstructed pixels; adding the first cumulative residual value or the second cumulative residual value to a sum variable of said same band, and adding the first cumulative number or the second cumulative number to a count variable of said same band; and
performing a pixel compensation on the target reconstructed image based on the sum variable and the count variable.

2. The method according to claim 1, further comprising:
reading the m consecutive band values from the first array;
storing the read band values in a first variable with preset bits;
fetching one of the band values from the first variable;
copying the fetched band value m−1 times to obtain the copied band values;
storing the copied band values in a second variable with the preset bits;
in response to determining that the first variable is equal to the second variable, determining that the m consecutive band values in the first array belong to the same band; and
in response to determining that the first variable is not equal to the second variable, determining that the m consecutive band values in the first array do not belong to the same band.

3. The method according to claim 2, further comprising:
when the first variable is not equal to the second variable, acquiring, from each of the first variable and the second variable, values in a preset number of bits that correspond to the n consecutive band values; and
in response to determining that the values acquired from the first variable are equal to the values acquired from the second variable, determining that the n consecutive band values of the m consecutive band values belong to the same band.

4. The method according to claim 3,
wherein m=8, n=4,
wherein each band value is represented by an 8-bit value,
wherein the first variable with the preset bits is a 64-bit first variable, and
wherein acquiring, from each of the first variable and the second variable, values in the preset number of bits that correspond to the n consecutive band values comprises:
acquiring, from each of the first variable and the second variable, values in 32 least significant bits or 32 most significant bits.

5. The method according to claim 2, wherein fetching one of the band values from the first variable comprises:
fetching a band value at a preset location from the first variable.

6. A computer device, comprising:
a processor; and
a memory, wherein the memory stores computer executable instructions that, when executed by the processor, cause the processor to:
acquire a target reconstructed image
divide the target reconstructed image into a plurality of non-overlapping coding tree blocks;
traverse all reconstructed pixels in each coding tree block to calculate a band value of each traversed reconstructed pixel, and a residual value between each traversed reconstructed pixel and a corresponding original pixel;
store the calculated band value of each reconstructed pixel in a first array and the calculated residual value between each reconstructed pixel and the corresponding original pixel in a second array;

in response to determining that m consecutive band values in the first array belong to a same band, wherein m is an integer greater than or equal to 2:
  calculate a first cumulative residual value of m reconstructed pixels corresponding to the m consecutive band values at a time based on the residual values in the second array of the m reconstructed pixels; and
  calculate a first cumulative number of the m reconstructed pixels;
in response to determining that the m consecutive band values in the first array do not belong to the same band:
  in response to determining that n consecutive band values of the m consecutive band values belong to the same band, wherein n<m and n is an integer greater than or equal to 2:
    calculate a second cumulative residual value of n reconstructed pixels corresponding to the n consecutive band values at a time based on the residual values in the second array of the n reconstructed pixels; and
    calculate a second cumulative number of the n reconstructed pixels;
  adding the first cumulative residual value or the second cumulative residual value to a sum variable of said same band, and adding the first cumulative number or the second cumulative number to a count variable of said same band; and
performing a pixel compensation on the target reconstructed image based on the sum variable and the count variable.

7. The computer device according to claim 6, wherein the computer executable instructions, when executed by the processor, further cause the processor to:
  read the m consecutive band values from the first array;
  store the read band values in a first variable with preset bits;
  fetch one of the band values from the first variable;
  copy the fetched band value m−1 times to obtain the copied band values;
  store the copied band values in a second variable with the preset bits;
  in response to determining that the first variable is equal to the second variable, determine that the m consecutive band values in the first array belong to the same band; and
  in response to determining that the first variable is not equal to the second variable, determine that the m consecutive band values in the first array do not belong to the same band.

8. The computer device according to claim 7, wherein the computer executable instructions, when executed by the processor, further cause the processor to: when the first variable is not equal to the second variable,
  acquire, from each of the first variable and the second variable, values in a preset number of bits that correspond to the n consecutive band values; and
  in response to determining that the values acquired from the first variable are equal to the values acquired from the second variable, determine that the n consecutive band values of the m consecutive band values belong to the same band.

9. The computer device according to claim 8,
wherein m=8, n=4,
wherein each band value is represented by an 8-bit value,
wherein the first variable with the preset bits is a 64-bit first variable, and wherein acquiring, from each of the first variable and the second variable, values in the preset number of bits that correspond to the n consecutive band values comprises:
  acquiring, from each of the first variable and the second variable, values in 32 least significant bits or 32 most significant bits.

10. The computer device according to claim 7, wherein fetching one of the band values from the first variable comprises:
  fetching a band value at a preset location from the first variable.

11. A non-transitory computer-readable storage medium having computer instructions stored thereon that, when executed by a processor, cause the processor to:
  acquire a target reconstructed image
  divide the target reconstructed image into a plurality of non-overlapping coding tree blocks;
  traverse all reconstructed pixels in each coding tree block to calculate a band value of each traversed reconstructed pixel, and a residual value between each traversed reconstructed pixel and a corresponding original pixel;
  store the calculated band value of each reconstructed pixel in a first array and the calculated residual value between each reconstructed pixel and the corresponding original pixel in a second array;
  in response to determining that m consecutive band values in the first array belong to a same band, wherein m is an integer greater than or equal to 2:
    calculate a first cumulative residual value of m reconstructed pixels corresponding to the m consecutive band values at a time based on the residual values in the second array of the m reconstructed pixels; and
    calculate a first cumulative number of the m reconstructed pixels;
  in response to determining that the m consecutive band values in the first array do not belong to the same band:
    in response to determining that n consecutive band values of the m consecutive band values belong to the same band, wherein n<m and n is an integer greater than or equal to 2:
      calculate a second cumulative residual value of n reconstructed pixels corresponding to the n consecutive band values at a time based on the residual values in the second array of the n reconstructed pixels; and
      calculate a second cumulative number of the n reconstructed pixels;
  add the first cumulative residual value or the second cumulative residual value to a sum variable of said same band, and add the first cumulative number or the second cumulative number to a count variable of said same band; and
  perform a pixel compensation on the target reconstructed image based on the sum variable and the count variable.

12. The non-transitory computer-readable storage medium according to claim 11, wherein the computer instructions, when executed by the processor, further cause the processor to:
  read the m consecutive band values from the first array;
  store the read band values in a first variable with preset bits:
  fetch one of the band values from the first variable;
  copy the fetched band value m−1 times to obtain the copied band values;
  store the copied band values in a second variable with the preset bits;

in response to determining that the first variable is equal to the second variable, determine that the m consecutive band values in the first array belong to the same band; and in response to determining that the first variable is not equal to the second variable, determine that the m consecutive band values in the first array do not belong to the same band.

13. The non-transitory computer-readable storage medium according to claim 12, wherein the computer instructions, when executed by the processor, further cause the processor to: when the first variable is not equal to the second variable, acquire, from each of the first variable and the second variable, values in a preset number of bits that correspond to the n consecutive band values; and in response to determining that the values acquired from the first variable is equal to the values acquired from the second variable, determine that the n consecutive band values of the m consecutive band values belong to the same band.

14. The non-transitory computer-readable storage medium according to claim 13, wherein m=8, n=4, wherein each band value is represented by an 8-bit value, wherein the first variable with the preset bits is a 64-bit first variable, and wherein acquiring, from each of the first variable and the second variable, values in the preset number of bits that correspond to the n consecutive band values comprises:

acquiring, from each of the first variable and the second variable, values in 32 least significant bits or 32 most significant bits.

15. The non-transitory computer-readable storage medium according to claim 12, wherein fetching one of the band values from the first variable comprises:

fetching a band value at a preset location from the first variable.

* * * * *